United States Patent [19]

Shigemura

[11] Patent Number: 5,075,686
[45] Date of Patent: Dec. 24, 1991

[54] SWITCH INPUT DEVICE

[75] Inventor: Yoshihiro Shigemura, Yokohama, Japan

[73] Assignee: Canon Kabushiki Kaisha, Tokyo, Japan

[21] Appl. No.: 468,869

[22] Filed: Jan. 23, 1990

[51] Int. Cl.⁵ .................................. H03K 17/94
[52] U.S. Cl. ............................ 341;23; 341/22; 364/709.14
[58] Field of Search ............... 341/23, 22, 35; 364/709.1, 709.14, 709.15; 379/355; 400/485

[56] References Cited

U.S. PATENT DOCUMENTS

| | | | |
|---|---|---|---|
| 3,560,964 | 2/1971 | Bedell et al. | 341/23 |
| 3,956,745 | 5/1976 | Ellis | 341/23 |
| 4,336,530 | 6/1982 | Koike et al. | 341/23 |
| 4,855,746 | 8/1989 | Stacy | 341/23 X |
| 4,862,497 | 8/1989 | Seto et al. | 379/355 |
| 4,878,055 | 10/1989 | Kasahura | 341/23 |
| 4,879,557 | 11/1989 | Roche | 341/23 |
| 4,890,832 | 1/1990 | Komaki | 341/23 X |

OTHER PUBLICATIONS

D. O. Johnson, Jr., "Keyboard With Changeable Encoding and Key Designation", IBM Technical Disclosure Bulletin, vol. 13, No. 7, Dec. 1970, pp. 2041-2042.

Primary Examiner—Ulysses Weldon
Attorney, Agent, or Firm—Fitzpatrick, Cella, Harper & Scinto

[57] ABSTRACT

A switch input device has an operation input switch endowed with a plurality of kinds of input functions. An indication member movably provided near the switch and having the indications of the plurality of kinds of input functions discretely provided at different regions of the surface thereof, and a cover member having transparent portions and opaque portions and covering the indication member, and by the indication member being moved, one different kind of indications among the indications of the plurality of input functions are just opposed to the transparent portions of the cover member in conformity with the position of the indication member and the other kinds of indications are just opposed to the opaque portions, whereby the indications of the input functions of the switch are changed over.

11 Claims, 14 Drawing Sheets

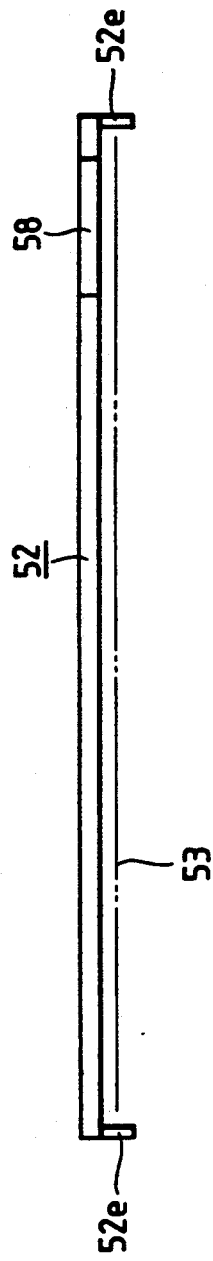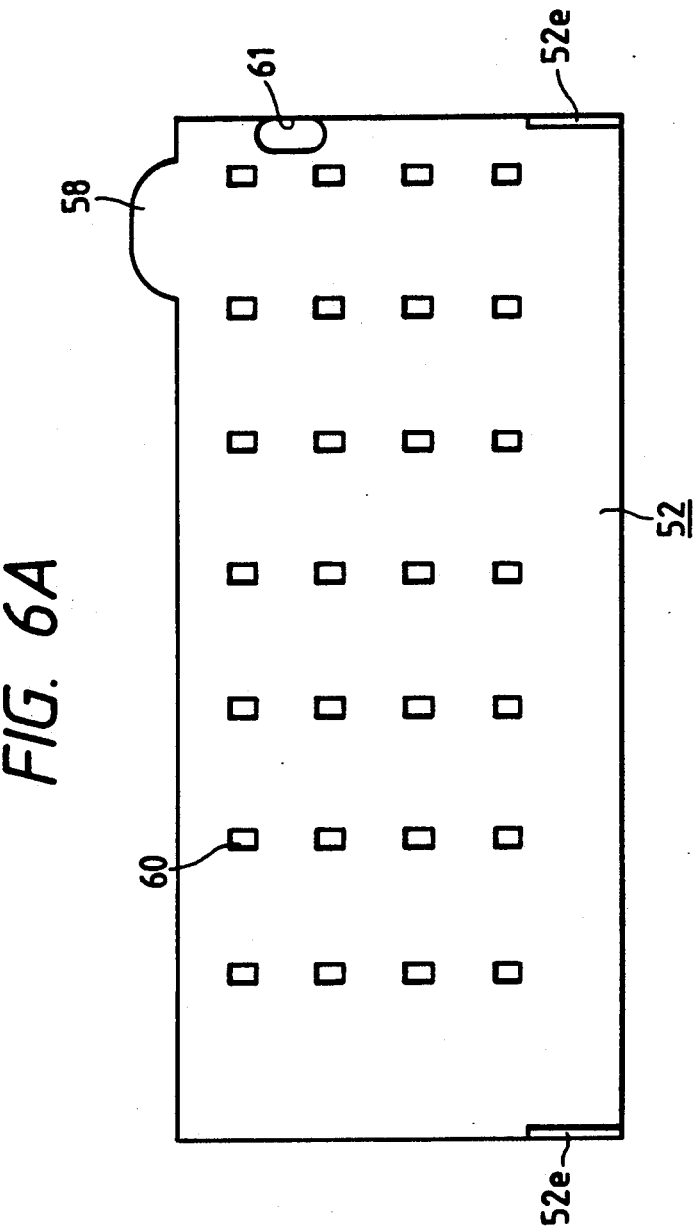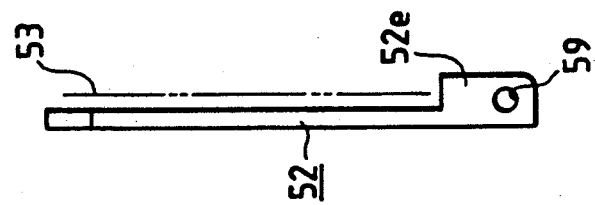

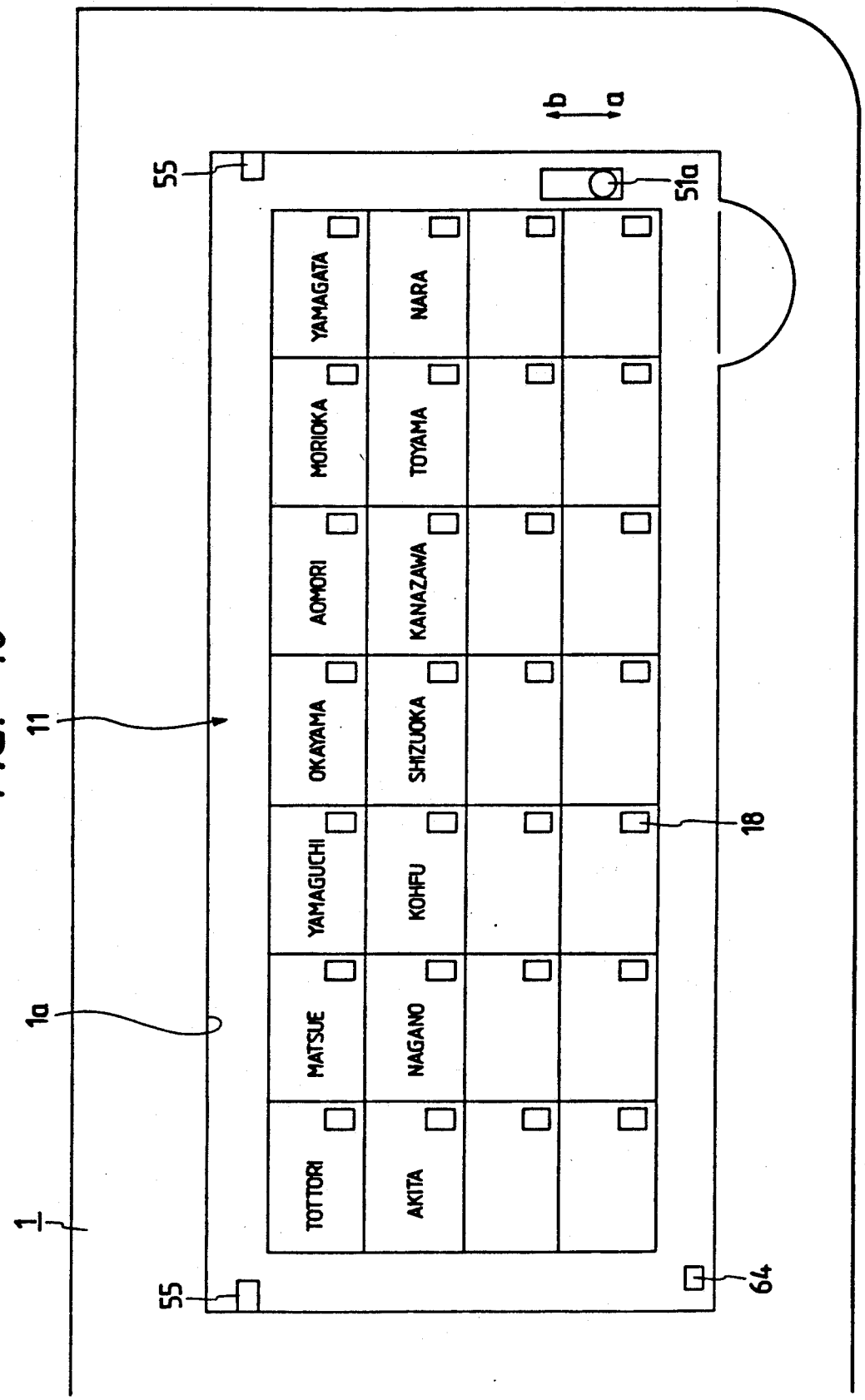

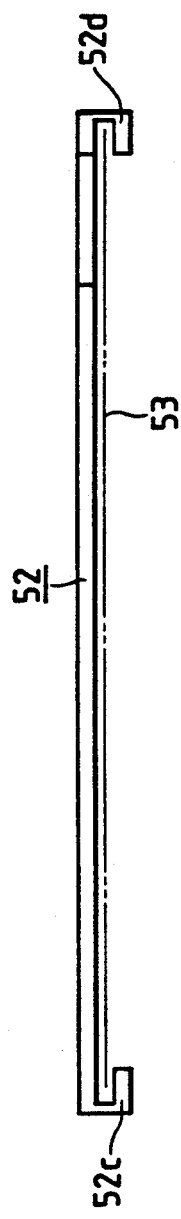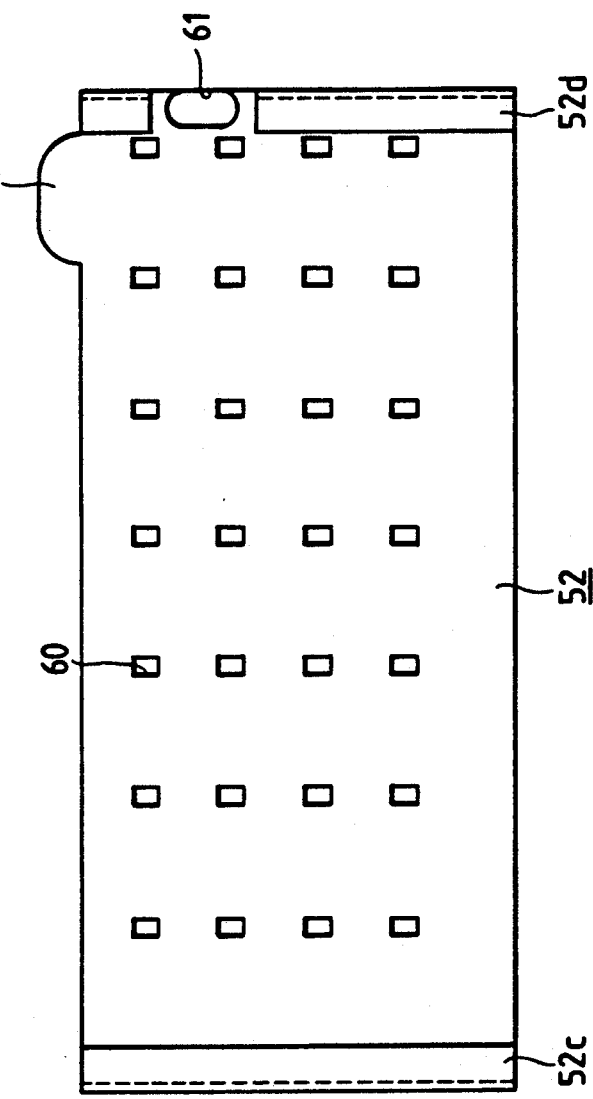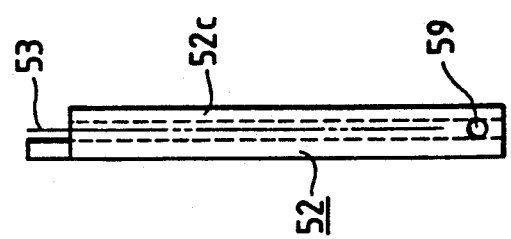

SWITCH INPUT DEVICE

BACKGROUND OF THE INVENTION

1. Field of the Invention

This invention relates to a switch input device for an operation panel apparatus, a keyboard apparatus or the like incorporated in various kinds of electronic instruments.

2. Related Background Art

In recent years, facsimile apparatus or the like as electronic instruments incorporating operation panel apparatuses therein have come to be provided with various high functions and the tendency thereof toward multiple functions has been progressing. With such a tendency toward high functions and multiple functions, the number of operation input switches on an operation panel is in a tendency toward an increase. This increase in the number of switches leads to the smaller size of the individual switches, which in turn leads to a problem such as the aggravated operability or the difficulty with which the dispositions of the many switches are remembered and a desired switch is found out. There is also a problem that the indications of the input functions of the switches are so numerous that it difficult to discriminate between them or to make entries.

So, there is adopted a construction in which an operation input switch is endowed with a plurality of input functions which are adapted to be changed over. In such system (disclosed, for example, in FIG. 1 of Japanese Patent Application Laid-Open No. 56-140457), a cover having apertures in which the key tops of individual switches fit is openably provided over the group of switches and the input functions may be changed over by opening or closing the cover. In this case, the indications of the plurality of input functions of the individual switches are discretely provided on the cover and the surface or the like of an operation panel which underlies the cover. By doing so, the input functions of the switches as well as the indications of the functions can be changed over in response to the opening or closing of the cover. Thus, there is afforded a margin of space for the indications of the functions of each switch, and the indications of the functions become easy to discriminate between or make entries.

However, such a construction in which the change-over of the input functions of each switch and the indications of the functions is effected through the cover is not free of a case where when the cover is opened, the cover protrudes onto the operation panel and interferes with the operation of the apparatus. For example, in a facsimile apparatus, there is a problem that when the cover is in its opened state, it hinders the operator from handling originals to be transmitted. There is also a problem that the opened state of the cover provides ugly appearances.

SUMMARY OF THE INVENTION

It is an object of the present invention to overcome the above-noted disadvantages and to eliminate the problem in operation and the problem in appearances by moving an indication member to thereby effect the change-over of the indications of the functions of switches.

It is another object of the present invention to provide improved construction of the coupling portion between an indication member and an operating member.

It is still another object of the present invention to embody the linear moving construction of an operating member for stably operating an indication member.

It is yet still another object of the present invention to improve the operability of an operating member.

BRIEF DESCRIPTION OF THE DRAWINGS

FIGS. 6A, 6B and 6C are a bottom plan view, a front view and a side view, respectively, of the switch cover of FIG. 5B.

FIG. 10 is a plan view showing a second modification of the first embodiment of the present invention with the switch cover and slide sheet of the keyboard portion thereof removed.

FIGS. 11A, 11B, and 11C are a bottom plan view, a front view and a side view, respectively, showing the structure of a switch cover according to the second modification of FIG. 10.

DESCRIPTION OF THE PREFERRED EMBODIMENTS

Some embodiments of the present invention will hereinafter be described with reference to the drawings, and description will first be made of a first embodiment of the present invention.

Figure 1:
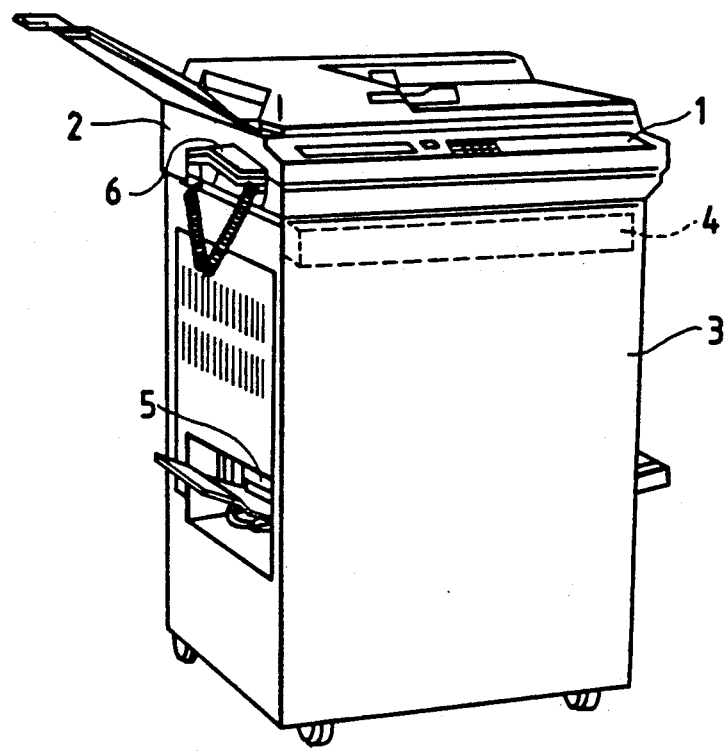
FIG. 1 is a perspective view of a facsimile apparatus provided with a switch input device according to a first embodiment of the present invention.

Referring to FIG. 1 which shows the whole of a facsimile apparatus, the reference numeral 1 designate an operation panel, the reference numeral 2 denotes a scanner unit, the reference numeral 3 designates a pedestal containing a controller 4 therein, the reference numeral 5 denotes a printer, and the reference numeral 6 designates a telephone set.

Figure 2:
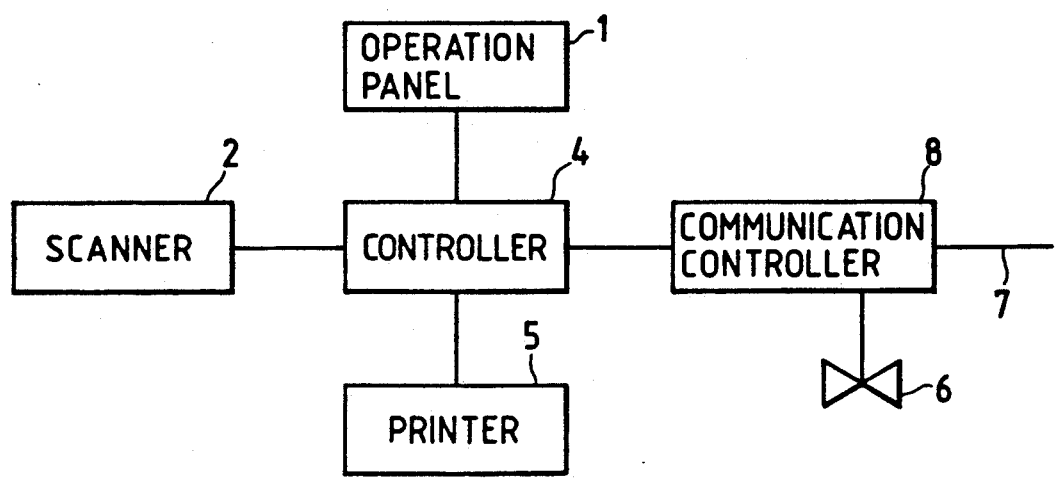
FIG. 2 is an electrical circuit block diagram of the facsimile apparatus shown in FIG. 1.

These are electrically connected together as shown in FIG. 2. That is, the controller 4 is comprised of a microcomputer which effects the control of the entire facsimile apparatus, and the operation panel 1 is connected to this controller 4, and in addition, the scanner unit 2 for reading the images of originals to be transmitted, the printer 5 for effecting the recording and outputting of received images, and a communication controller 8 comprising a modem and net control device effecting various processes for effecting communications through a circuit 7, such as modulation of transmitted and received image signals are connected to the controller 4. The telephone set 6 is connected to the communication controller 8. The controller 4 may control these in conformity with the input from the operation panel 1 and effect image communications.

Figure 3:
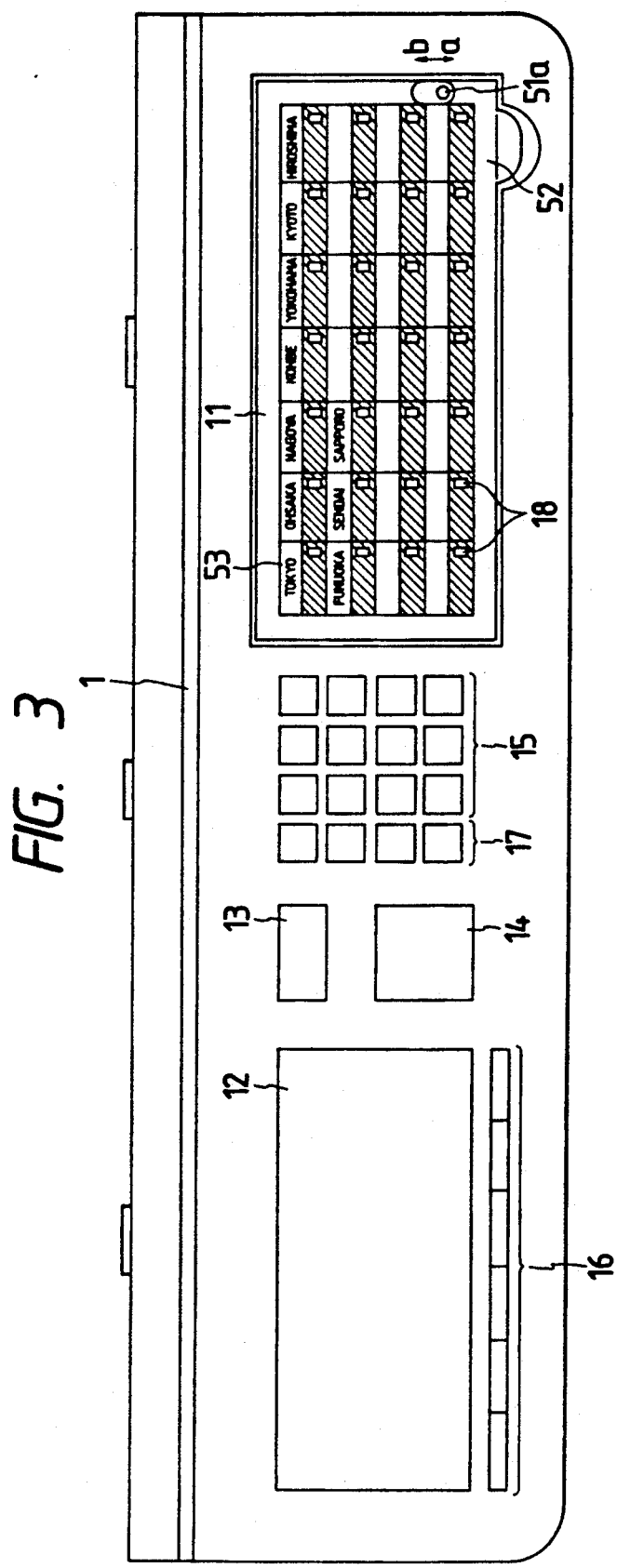
FIG. 3 shows the external appearance of an operation panel as the switch input device shown in FIG. 1.

FIG. 3 specifically shows the operation panel 1 shown in FIG. 1, and on this operation panel 1, there are provided a keyboard portion 11, an indicator 12, a stop button 13, a start button 14, ten-keys 15, switches 16 and 17 of highly frequently used functions, etc. On the keyboard portion 11, a predetermined number of switches 18 for operation input are arranged in the form of a matrix at predetermined intervals. Each switch 18 has its input function changed over through the knob 51a of a slide switch 51 as will be described later, and functions to input the dial numbers of respective preregistered addresses by one touch or input various functions of the facsimile apparatus. The reference numeral 52 designates a switch cover under which there is provided a slide sheet 53. The indicator 12 comprises a liquid crystal indicating element or the like, and effects various indications such as the indication of the operational state of the facsimile apparatus. The stop button 13 and the start button 14 are used for the control of the stop and start of the transmitting and receiving operations and the copying operation of the facsimile apparatus. The ten-keys 15 are used chiefly for dialing, and the switches 16 and 17 of highly frequently used functions are switches often used when using the facsimile, and selecting or executing respective indicated functions.

Figure 4:
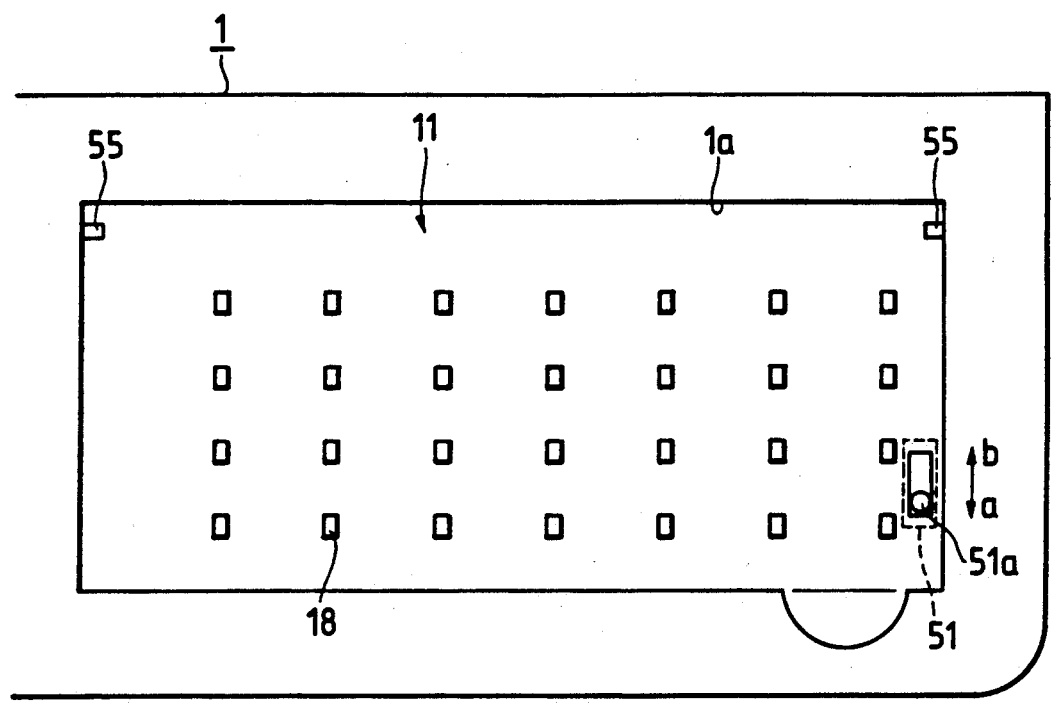
FIG. 4 is a plan view of the keyboard portion of the operation panel shown in FIG. 3, with a switch cover and a slide sheet removed therefrom.

FIG. 4 shows the keyboard portion 11 with the switch cover 52 and the slide sheet 53 removed therefrom. As shown, a shallow rectangular recess 1a is formed in the area of the keyboard portion 11 on the operating panel 1, and on the flat bottom plate of this recess 1a, the aforementioned switches 18 are arranged in the form of a matrix at predetermined intervals, and are projected on the bottom plate. The knob 51a of the slide switch is provided at the right of the group of switches 18 in the recess 1a.

The knob 51a of the slide switch is adapted to be operated in the directions of bilateral arrow a, b, i.e., the vertical direction of the arrangement of the switches 18 as viewed in FIG. 4, and it is to be understood here that when the knob is operated to the end in the direction a, the slide switch is closed and when the knob is operated to the end in the direction b, the slide switch is opened. By the operation of the knob 51a of the slide switch, the input functions of the respective switches 18 are adapted to be changed over to the aforementioned two kinds.

Also, by the operation of the knob 51a of the slide switch in the directions a and b, the slide sheet 53 which will be described later is adapted to be moved in the directions a and b within the recess 1a.

Shafts 55 and 55 for openably (pivotably) supporting the switch cover 52 which will be described later are projectedly provided in the inner end portions of the both side edges of the recess 1a.

Figure 5B:
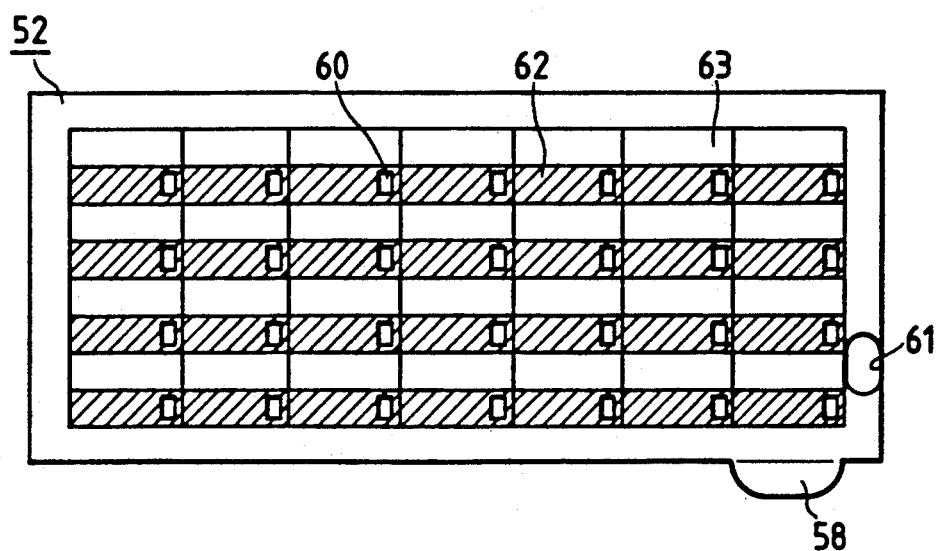
FIG. 5B is a top plan view of the switch cover shown in FIG. 4.
Figure 5A:
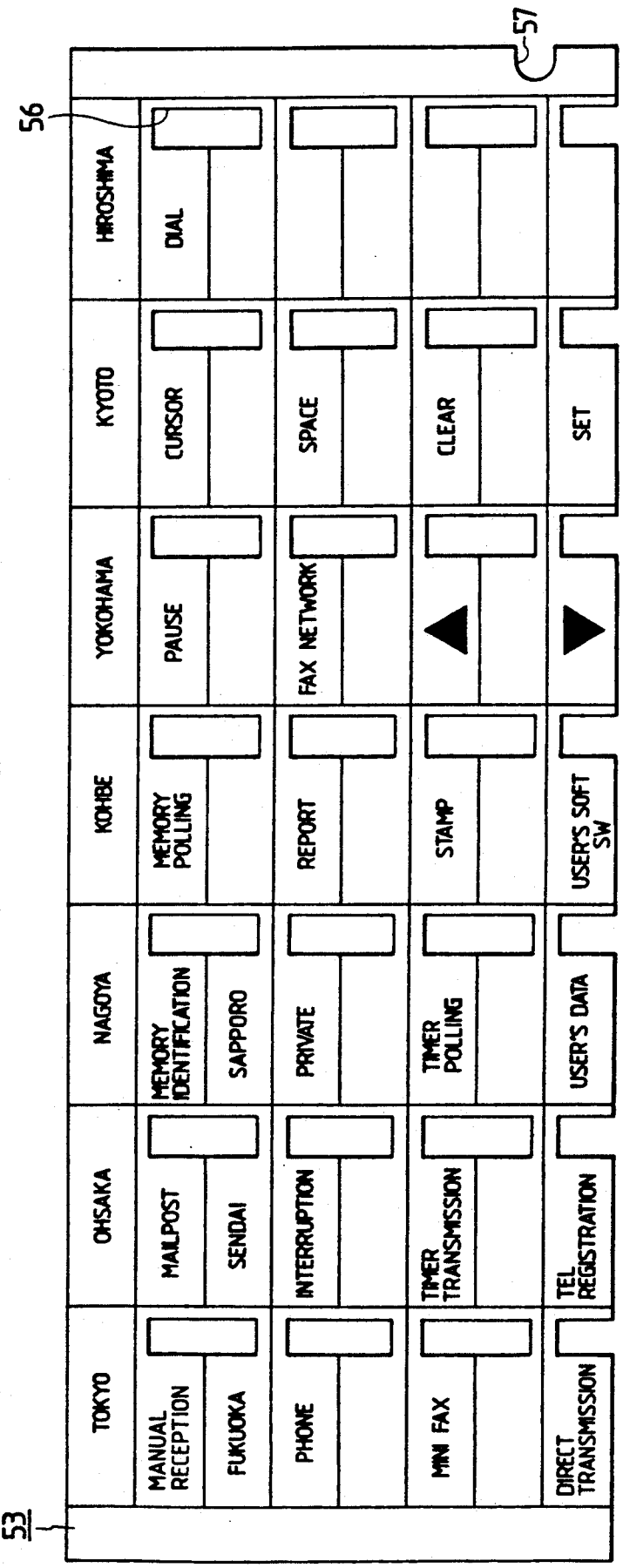
FIG. 5A is a top plan view of the slide sheet shown in FIG. 4.

The slide sheet 53 shown in FIG. 5A is removably provided on the bottom plate of the recess 1a. The slide sheet 53 is an indicating member of effecting the indications of the input functions of the respective switches 18 on the keyboard portion 11. The slide sheet 53 is formed into a rectangle smaller than the recess 1a, and slots 56 length-wisely longer than the key tops of the switches 18 are formed in a matrix-like arrangement corresponding to the arrangement of the switches 18. Also, the surface of the slide sheet 53 is divided by printed or otherwise provided lengthwise and breadthwise lines into rectangular indication areas of the matrix-like arrangement for effecting the indications of the functions of the respective switches 18. Two upper and lower stages of indication areas are allotted per each of the switches 18, and the address names of one touch dial numbers such as "TOKYO", "OSAKA", etc. are written on the upper stages, and the indications of various functions of the facsimile apparatus such as "MANUAL RECEPTION", "MAIL POST". etc. are provided on the respective lower stages by printing or the like.

Further, a cut-away 57 adapted to be engaged by the knob 51a of the aforedescribed slide switch 51 is formed in the lower end portion of the right side edge of the slide sheet 53 as viewed in FIG. 5A.

The slide sheet 53 is inserted into the recess 1a, the key tops of the switches 18 are loosely fitted into the respective slots, and the knob 51a of the slide switch is brought into engagement with the cut-away 57, whereby the slide sheet is set on the bottom plate of the recess 1a. By operating the knob 51a of the slide switch in the directions a and b in this state, the slide sheet 53 engaged therewith may slide in the directions a and b. Owing to the slots 56, the key tops of the switches 18 do not hinder the movement of the slide sheet 53.

Next, the switch cover 52 shown in FIGS. 5B and 6A-6C is openably provided on the slide sheet 53 thus set in the recess 1a. The switch cover 52 is formed into a rectangular plate-like shape of a size corresponding to the recess 1a, and a projection 58 as a knob for opening-closing operation is formed on the right end portion of the front edge of the switch cover. Also, projection-like bearing portions 52e, 52e are projectedly provided on the inner end portions of the opposite side edges on the underside of the switch cover 52, and are formed with bearing holes 59. The shafts 55 and 55 of the recess 1a are fitted into the bearing holes 59, and the switch cover 52 is provided on the recess 1a, i.e., on the slide sheet 53 so as to be openable and closable with the shafts 55 and 55 as pivots. Thus, the entire slide sheet 53 is covered with the switch cover 52.

Apertures 60 sized to permit the key tops of the switches 18 to fit therein are provided at regions in the switch cover 52 which correspond to respective ones of the switches 18. Also, a slot 61 having a length great enough to permit the knob 51a of the slide switch to be loosely fitted therein and operated in the directions a and b is formed at a region in the switch cover 52 which corresponds to the knob 51a of the slide switch. Thus, even when the switch cover 52 is closed on the recess 1a, the key tops of the switches 18 and the knob 51a of the slide switch are projected onto the switch cover 52 through the apertures 60 and the slot 61, respectively, so that the switches 18 and the knob 51a of the slide switch can be operated.

Further, as shown in FIG. 5B, the surface of the switch cover 52 is divided by printed or other wise provided lengthwise and breadthwise lines into rectangular areas of matrix-like arrangement corresponding to the indication areas of matrix-like arrangement on the slide sheet 53. The rectangular areas on every other stage in the vertical direction are opaque portions 62 as shown by hatching, and the areas therebetween are transparent portions 63 as shown by white grounds.

The operation of the above-described construction will now be described.

By operation the knob 51a of the slide switch with the slide sheet 53 being set in the recess 1a and the switch cover 52 being closed thereon, the indications of the functions of the switches 18 are changed over as will be described hereinafter.

That is, with the knob 51a of the slide switch operated to the end of the slot 61 in the direction a as shown in FIG. 3, the slide sheet 53 moved in the direction a by the knob 51a of the slide switch is in a position wherein those of the rectangular indication areas of the slide sheet 53 shown in FIG. 5A in which the addresses of one touch dial numbers are entered are just opposed to the transparent portions 63 of the switch cover 52. Also, those of the indication areas of the slide sheet 53 which are provided with the indications of the various functions of the facsimile apparatus are just opposed to the opaque portions 62 of the switch cover 52. Accordingly, as shown in FIG. 3, only the indications of the addresses of one touch dial numbers are visually perceived as the indications of the functions of the switches 18.

As the knob 51a of the slide switch is then operated from this state toward the end of the slot 61 in the direction b, the slide sheet 53 is moved in the direction b, whereby the indication areas of the slide sheet 53 indicating the various functions of the facsimile apparatus become just opposed to the transparent portions 63 and the indication areas of the addresses of one touch dial numbers become just opposed to the opaque portions 62. That is, the indications of the various functions of the facsimile apparatus are visually perceived as the indications of the respective input functions of the switches 18.

By further operating the knob 51a of the slide switch from this state toward the end of the slot in the direction a, the state shown in FIG. 3 is restored and only the indications of the addresses of one touch dial numbers are visually perceived.

Also, in response to such operation of the knob 51a of the slide switch, i.e., in response to the change-over of the indications of the functions, the respective input functions of the switches 18 are changed over to the above-mentioned two kinds by the control of the controller 4 of FIG. 2. The slide switch 51 is connected to the controller 4, which effects the change-over of the input functions of the switches 18 by the procedure shown in FIG. 7 in conformity with the input of ON or OFF from the slide switch 51. This process is carried out as follows in accordance with the control program stored in the memory of the microcomputer constituting the controller 4.

Figure 7:
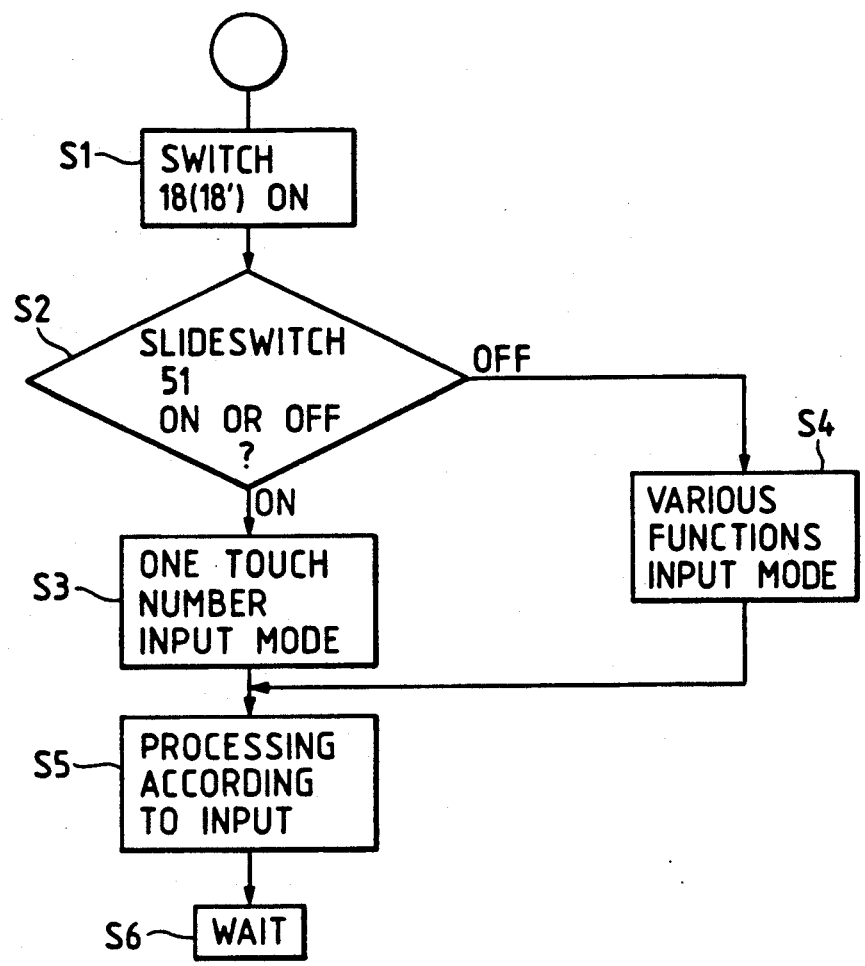
FIG. 7 is a flow chart showing the procedure of the switch input function change-over process by a controller in FIG. 2.

First, when at the step S1 of FIG. 7, there is a switch input by a switch 18, the CPU of the controller 4 proceeds to step S2, where whether the slide switch 51 is ON or OFF is examined. That is, whether the slide sheet 53 is in the position wherein the indication area of the addresses of one touch dial numbers are just opposed to the transparent portions 63 of the switch cover 52 or in the position wherein the indication areas of the various functions of the facsimile apparatus are just opposed to the transparent portions 63 is examined.

If the slide switch 51 is ON and the indications of the addresses of one touch dial numbers are just opposed to the transparent portions 63, advance is made to step S3, where the input mode of the switch 18 is rendered into the one touch dial number input mode, and the code signal input by the switch 18 is processed a the input signal of a one touch dial number.

On the other hand, if the slide switch 51 is OFF and the indicatins of the various functions of the facsimile apparatus are just opposed to the transparent portions 63, advance is made to step S4, where the input mode is rendered into the input mode of the various functions of the facsimile apparatus and the input signal from the switch 18 is processed.

After the step S3 or S4, at step S5, processing conforming to the switch input is carried out under the input mode determined in the manner described above, When the processing is terminated, at step S6, a switch input is waited for.

In the manner described above, in the present embodiment, the slide sheet 53 is slidden by the operation of the slide switch 51 and the indication of the function of each switch 18 is changed over to two kinds and also the input function of each switch 18 is changed over to two kinds corresponding to the indications. The slide switch 51 is a member for sliding the slide sheet 53 and also functions as detecting means for detecting the position of the slide sheet 53 in which the indications of the functions are changed over as described above, and the slide switch 51 singly can perform two functions.

Thus, according to the present embodiment, the change-over of the input function of each switch 18 of the keyboard portion 2 and the change-over of the indications of the functions can be simply accomplished by the operation of the slide switch 51. Moreover, such change-over is effected with the switch cover 52 closed and there does not arise the problem that as in the aforedescribed example of the prior art, the cover is opened for the change-over and interfaces with the operation of the apparatus or the external appearance of the apparatus becomes ugly.

In the above-described structure, the switch cover 52 can be opened to thereby permit the slide sheet 53 to be removed from the recess 1a, and the addresses of one touch dial numbers can be entered in the slide sheet 53.

Now, in the above-described construction, each switch 18 of the keyboard portion 11 is endowed with two kinds of input functions and two kinds of changeover of the indications of the functions are effected, but the change-over of the indications can be effected in more kinds by a change-over system using the sliding of the above-described slide sheet 53. The construction of the slide sheet 53 and switch cover 52 when changing over the indications of the functions to three kinds is shown as a first modification of the first embodiment of the present invention in FIGS. 8 and 9.

These figures show a portion of the surface of the slide sheet 53 and a portion of the surface of the switch cover 52, respectively.

Figure 8:
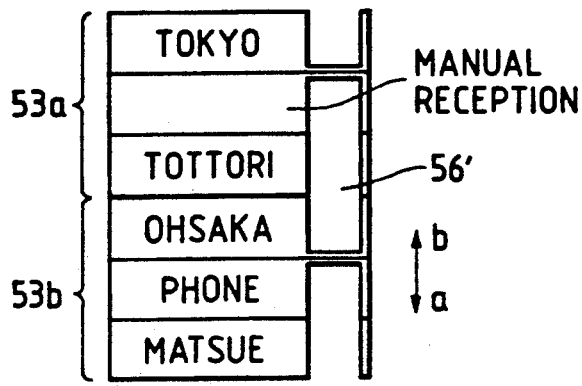
FIG. 8 illustrates the construction of a slide sheet according to a first modification of the first embodiment of the present invention.

In FIG. 8, the reference characters 53a and 53b designate the indication areas of the slide sheet 53 which correspond to one of the switches 18. In this case, the indication areas 53a and 53b are each divided into three stages in the directions of movement a and b of the slide sheet 53, and two addresses of one touch dial numbers and one indication of the functions of the facsimile apparatus are provided for the three stages of areas.

Figure 9:
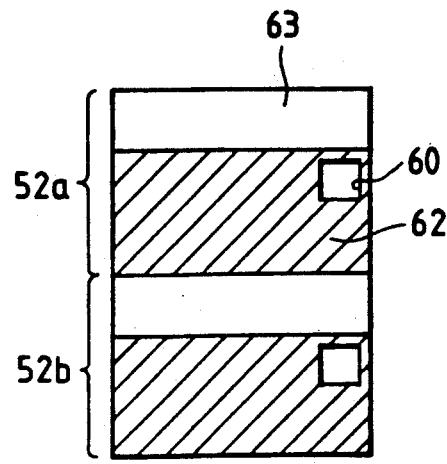
FIG. 9 illustrates a switch cover according to the FIG. 8 modification.

In the switch cover 52 shown in FIG. 9, the reference characters 52a and 52b denote areas corresponding to one switch 18. The sizes of these areas correspond to the sizes of the indication areas 53a and 53b of the slide sheet 53.

Correspondingly to the division of the indication areas 53a and 53b into three stages in the directions a and b, ⅓ of each of the areas 52a and 52b in the direction a is a transparent portion 63 and the remaining ⅔ is an opaque portion 62.

By the slide sheet 53 being slidden in the directions a and b under the thus constructed switch cover 52, one of the three areas of each of the indication areas 53a and 53b is just opposed to the transparent portion 63 of each of the areas 52a and 52b of the switch cover 52 and the indication is changed over to three kinds.

Also, in this case, it is to be understood that the slide switch for sliding the slide sheet have three operated positions in the directions a and b and different outputs are obtained depending on the three operated positions. The input functions of the switches 18 can be changed over in conformity with these outputs.

In this manner, more kinds of change-over of the input functions and change-over of the indications of the functions can be accomplished.

The construction of a second modification of the first embodiment of the present invention will now be described with reference to FIGS. 10 and 11A-11C.

In these figures, portions common or corresponding to those of the first embodiment shown in FIGS. 1 to 7 are given common reference characters and need not be described.

In this modification, it is to be understood that each switch 18 of the keyboard portion 11 is endowed with three kinds of input functions, for example, the various functions of the facsimile apparatus and the input functions of first and second one touch dial numbers.

Thus, a first difference in the specific construction from the first embodiment is that as shown in FIG. 10, the surface of the bottom plate of the recess 1a of the keyboard portion 11 is the indication surface for the address of the second one touch dial number input by each switch 18. That is, the surface of the bottom plate is divided by printed or otherwise provided lengthwise and breadthwise lines into rectangular areas of matrix-like arrangement corresponding to the arrangement of the switches 18, and in the indication areas corresponding to respective ones of the switches 18, the addresses of one-touch dial numbers such as "TOTTORI", "MATSUE", etc. are entered or otherwise indicated.

Also, a sensor 64 for detecting the opened or closed state of the switch cover 52 shown in FIGS. 11A-11C is provided at the left lower corner of the recess 1a as viewed in FIG. 10. This sensor 64 is constructed, for example, as a switch adapted to be depressed by the switch cover 52 in response to the opening or closing of the switch cover 52 and closed or opened thereby. It is understood that the detection output of this sensor 64 is input to the controller 4 of the facsimile apparatus.

A second difference of the structure of the switch cover 52 shown in FIGS. 11A-11C from the first embodiment is that the opposite side edge portions 52c and 52d of the switch cover 52 are downwardly bent into an L-shape. By the opposite side edge portions of the slide sheet 53 being inserted between the bent portions of the opposite side edge portions 52c and 52d of the switch cover 52, the slide sheet 53 is held for sliding in the directions a and b by the switch cover 52. That is, when the switch cover 52 is opened, the slide sheet 53 is raised from the recess 1a with the switch cover 52. The slide sheet 53 is common to that in the first embodiment.

In a state in which the switch cover 52 is closed under such a construction, the controller of the facsimile apparatus renders the input mode of each switch 18 of the keyboard portion 11 into the input mode of the various functions of the facsimile apparatus or the first one touch dial number in conformity with the detection output of the sensor 64 which has detected the closed state of the switch cover. As in the case of the first embodiment, in response to the operation of the knob 51a of the slide switch in the directions a and b, the indication of the function of each switch 18 is changed over to the various functions of the facsimile apparatus or the address of the first one touch dial number and also, in conformity with the output of the slide switch 51, the input function of each switch 18 is changed over to the various functions of the facsimile apparatus or the input function of the first one touch dial number by the control of the controller.

When from this state, the switch cover 52 is then opened on the recess 1a, the controller of the facsimile apparatus changes over the input function of each switch 18 to the input function of the second one touch dial number in conformity with the detection output of the sensor 64 which has detected the opened state of the switch cover 52. Also, by the switch cover 52 being opened, the indication surface of the bottom plate of the recess 1a is visually perceived and the indication of the address of the second one touch dial number shown in FIG. 10 is visually perceived as the indication of the function of each switch 18.

According to this modification, each switch 18 is endowed with three kinds of input functions, and the change-over of those functions and the indications of the functions can be accomplished and more kinds of change-over than in the first embodiment can be accomplished.

By combining such construction of the present modification with the aforedescribed construction of the first modification, the change-over of more kinds of functions and indications of the functions can be accomplished.

Of course, the kinds of the input functions with which each switch 18 is endowed are not limited to what been described above. Also, the construction as described above can of course be applied not only to an operation panel device incorporated in a facsimile apparatus, but also to other switch input devices.

Figure 12:
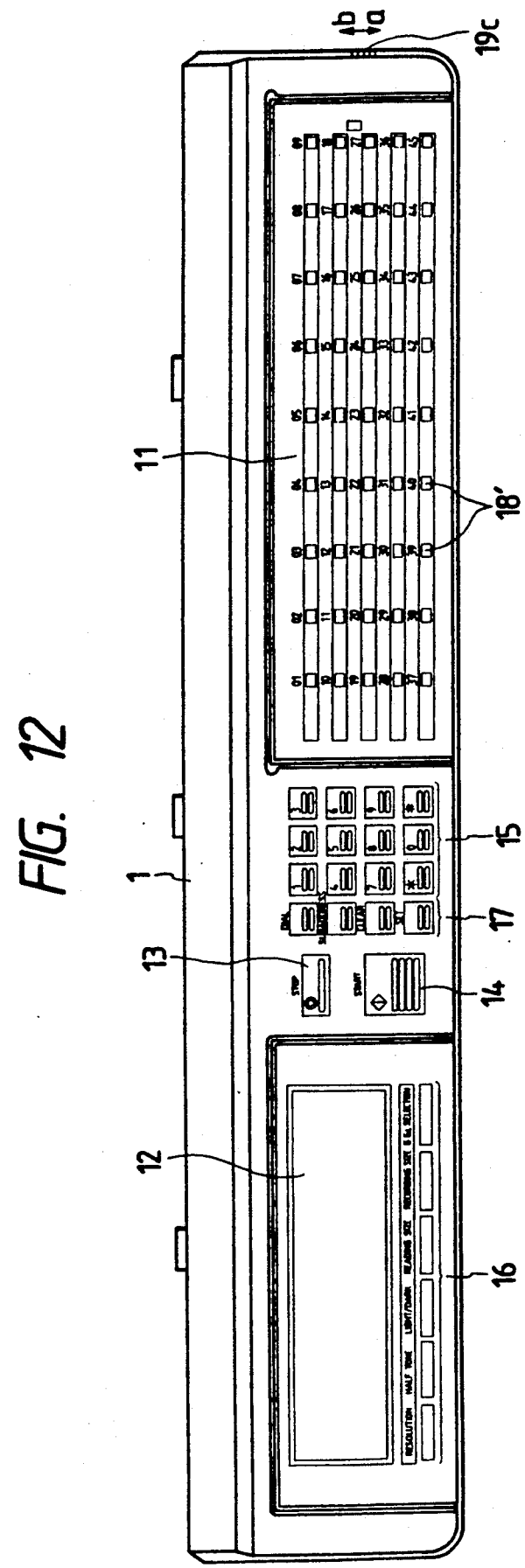
FIG. 12 shows a second embodiment of the present invention, and particularly the external appearance of the operation panel shown in FIG. 1.

A second embodiment of the present invention will now be described with reference to FIGS. 12 to 20, but the external appearance and the electrical block circuit of the facsimile apparatus are similar to those of the first embodiment of FIGS. 1 and 2 and need not be described in detail. FIG. 12 specifically shows the operation panel 1 of FIG. 1, but it is the same as FIG. 3 except for the keyboard portion 11 and the operating member, and portions differing from those in FIG. 3 will hereinafter be described. The reference numeral 18' designates switches for operation input, and the reference character 19c denotes a slide knob.

Figure 13:
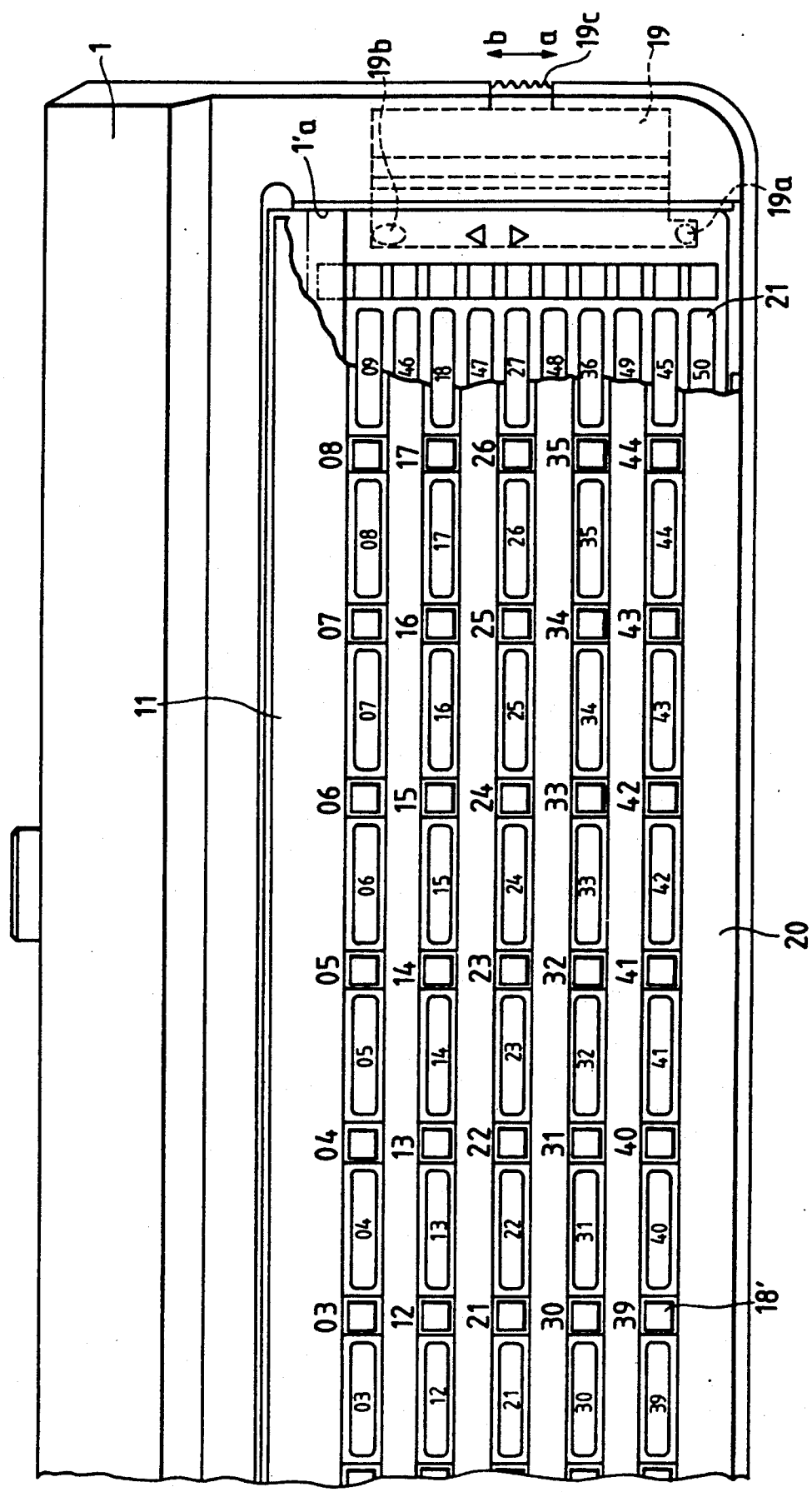
FIG. 13 is a partly broken-away plan view showing a keyboard portion shown in FIG. 12.

FIG. 13 shows a keyboard portion 11 with a switch cover 20 which will be described later partly broken away. As shown, in the operation panel 1, a shallow rectangular recess 1'a is formed in the are of the keyboard portion 11, and on the flat bottom plate of this recess 1'a, the aforementioned switches 18' are arranged at predetermined intervals in the form of a matrix and projected on the bottom plate. Also, slide pins 19a and 19b provided on a slide member 19 are projected on the opposite end portions near the right side of the group of switches 18' in the recess 1'a, as viewed in FIG. 13.

Figure 14:
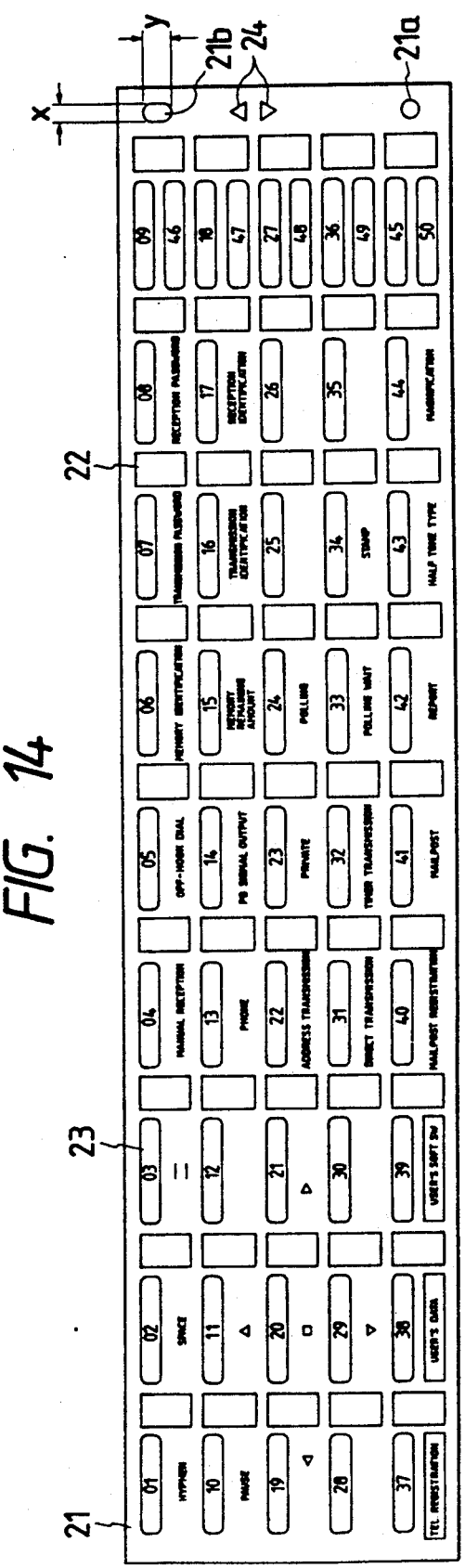
FIG. 14 is a detailed view of a slide sheet shown in FIG. 13.

A slide sheet 21 shown in FIG. 14 is removably provided on the bottom plate of the recess 1'a. The slide sheet 21 is an indication member for effecting the indication of the input functions of the switches 18'. The slide sheet 21 is formed in a rectangular shape smaller than the recess 1'a, and slots 22 lengthwisely longer than the key tops of the switches 18' are formed in the slide sheet in a matrix-like arrangement corresponding to the arrangement of the switches 18'. Two upper and lower stages of indication areas are allotted to each of the switches 18', and address label sticking positions 23 for entering the address names of one touch dial numbers are on the upper stages, and the indications of the various functions of the facsimile apparatus such as "MANUAL RECEPTION", "MAIL POST", etc. are printed or otherwise provided on the respective lower stages.

Further, a circular aperture 21a is formed in one of the side edges on one end portion of the slide sheet 21 and an oval aperture 21b is formed in the other side edge. Marks 24 indicating the directions of movement of the slide sheet 21 are provided on the central portion of one end portion of the slide sheet 21. The slide sheet 21 is inserted into the recess 1'a, the key tops of the switches 18' are loosely fitted into the respective slots 22, and the slide pins 19a and 19b are fitted into the apertures 21a and 21b, respectively. At this time, the aperture 21a is substantially of the same diameter as the slide pin 19a, the size y of the aperture 21b in the direction of movement is larger than the size y' of the slide pin 19b in the direction of movement, and the size x of the aperture 21b in a direction perpendicular to the direction of movement is substantially equal to the size x' of the slide pin 19a in a direction perpendicular to the direction of movement. Accordingly, the slide member 19 can hold the slide sheet 21 so as to control the movement of the slide sheet 21 in the direction of movement of the slide member 19 and a direction perpendicular to said direction of movement by the slide pin 19a and to control the movement of the slide sheet 21 in the direction of rotation about the slide pin 19a by the slide pin 19b. At this time, if the slide pin 19b is circular, the aperture and the shaft will contact with each other on a line, but the slide pins 19a, 19b and the apertures 21a, 21b are in contact with each other on a plane and therefore, it will never happen that the apertures 21a and 21b become larger while the slide member 19 is moved several times. By operating the slide member 19 in the directions a and b in this state by means of the slide knob 19c, the slide sheet 21 engaged therewith may rectilinearly slide in the directions a and b, like the slide member 19. At this time, the key tops of the switches 18' do not hinder the movement of the slide sheet 21 due to the slots 22.

Figure 15:
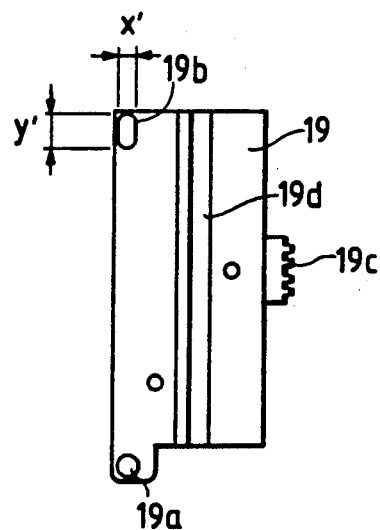
FIG. 15 is a plan view of a slide member shown in FIG. 13.
Figure 16:
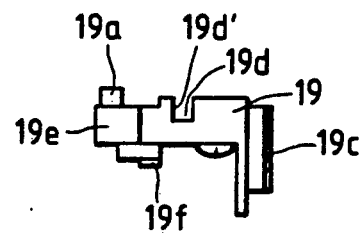
FIG. 16 is a cross-sectional view of the slide member shown in FIG. 15.
Figure 17:
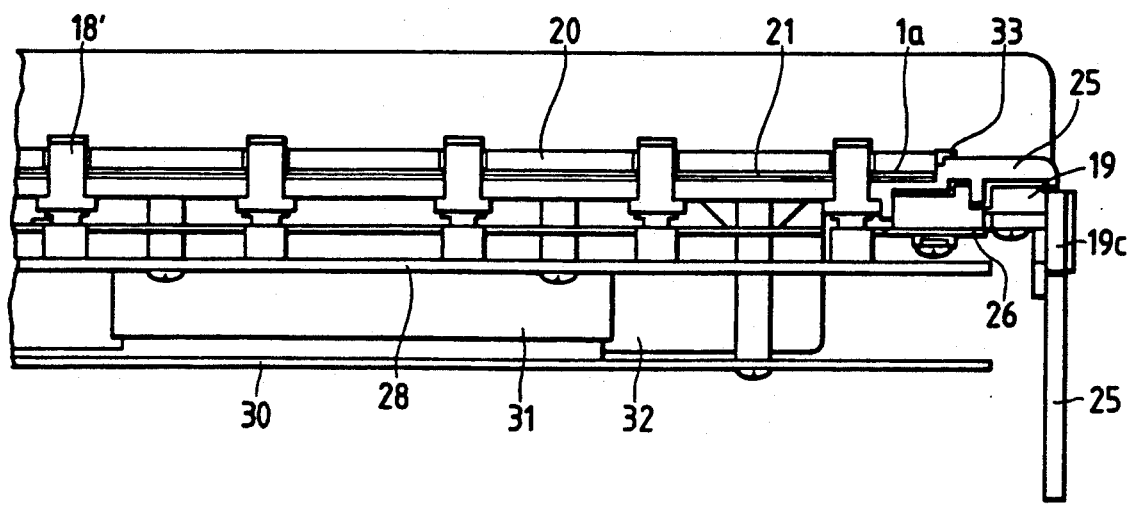
FIG. 17 is a cross-sectional view of the operation panel shown in FIG. 12.
Figure 18:
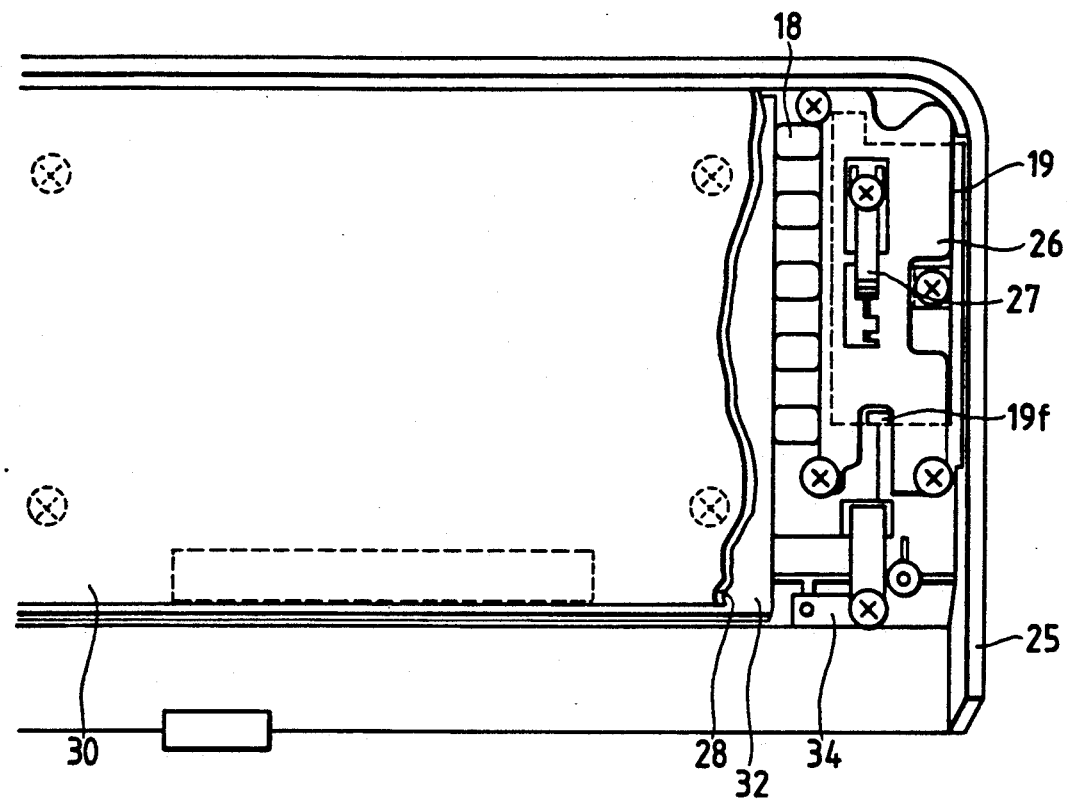
FIG. 18 is a partly broken-away bottom plan view shown in the operation panel shown in FIG. 12.
Figure 19:
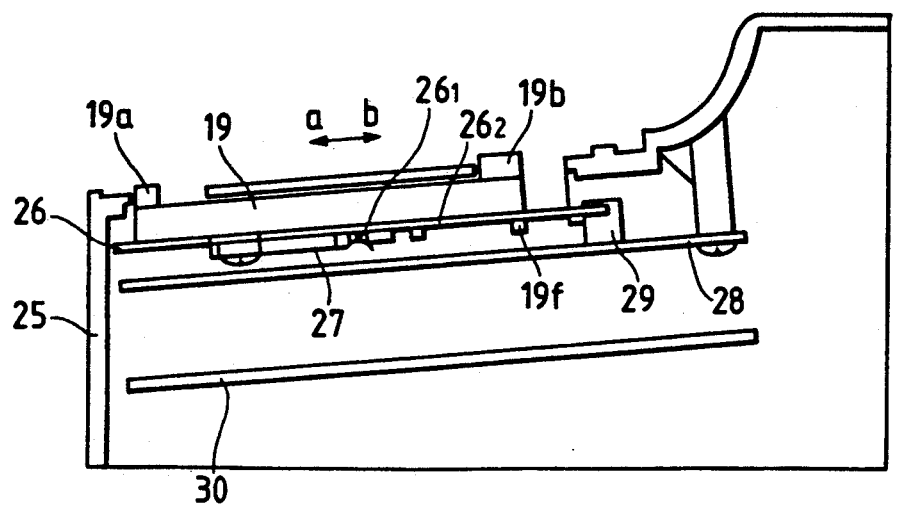
FIG. 19 is a cross-sectional view of the operation panel of FIG. 12 as it is seen from a switch member.

The slide member 19, as shown in FIGS. 15 and 16, is formed into a plate-like shape of a width approximate to the width of the slide sheet 21, and is provided with the circular slide pin 19a and the oval slide pin 19b at the opposite ends of the slide member 19 to stabilize the movement of the slide sheet 21, and the slide knob 19c adapted to be touched by the operator's fingers is attached to the slide member 19 by screws. A guide groove 19d is widthwisely provided in the slide member 19, which is fitted to a frame 25 so as to move rectilinearly smoothly in the direction of sliding without backlash with the aid of a side edge surface 19e of the slide member 19 and one surface $19d_1$ of the guide groove 19d, and is held by a keep plate 26 so as not to fall, as shown in FIG. 17. The frame 25 in this portion can move the slide member 19, and is of a corresponding shape so as to be along the side edge surface 19e and the guide groove 19d. The keep plate 26 is fixed to the frame 25 by screws, as shown in FIG. 18. A click plate 27 is secured to the slide member 19 by a screw, and the end of this click plate 27 comes into two cut-aways $26_1$ and $26_2$ formed in the central portion of the keep plate 26, whereby there is obtained the stationary position of the slide member 19 in the direction of movement thereof.

When the slide member 19 is moved in the direction b, the position of a change-over switch on a switch base plate 28 which will be described later is determined so that the convex portion 19f of the slide member pushes the change-over switch 29.

The slide member 19 is adapted to be operated along the directions of arrows a and b, i.e., the lengthwise direction of the arrangement of the switches 18', and it is to be understood here that the change-over switch 29 is closed when the knob of the slide member is operated to the end in the direction a, and is opened when the knob is operated to the end in the direction b. By the operation of this slide member 19, the input functions of the respective switches 18' may be changed over to the aforedescribed two kinds.

Also, by the operation of the slide member 19 in the directions a and b, the slide sheet 21 which will be described later may be moved in the directions a and b in the recess 1'a.

The opposite ends of the recess 1'a are parallel guide portions to facilitate the sliding of the slide sheet 21.

There are two base plates in the keyboard portion 11, and upper one of them is a switch base plate 28 on which is mounted a switch with LED adapted to be pushed by the switch 18' for operation input, and the switch with LED is designed such that when it is pushed by the switch 18' for operation input, the LED is turned on and the light thereof can be confirmed from the outside through the switch 18' for operation input formed of transparent acrylic resin. An operation panel CPU base plate 30 for controlling the entire operation panel 1 is provided under the switch base plate 28, and is electrically connected to the switch base plate 28 by a connector 31 between the base plates.

A cover metal sheet 32 substantially of the same size as the switch base plate 28 and formed with apertures for passing therethrough bosses for fixing the switches and the base plate is provided between the switch base plate 28 and the frame 25, and is secured by screws so as to contact with the ground pattern of the switch base plate 28 at several locations, and by this cover metal sheet 32 being attached to the switch base plate 28, the rigidity of the switch base plate 28, can be increased to thereby prevent warping of the base plate. Also, this structure is such that it is difficult for the destruction or malfunctioning of the circuit by static electricity transmitted when a person touches the switch to occur and it is difficult for radiation noise emitted from the base plate to leak to the outside.

Bearings 33 for openably (pivotably) supporting the switch cover 20 which will be described later and cover plate springs 34 for holding down the switch cover 20 from below so that the switch cover 20 when opened may be stationary are provided on the inner end portions of the opposite side edges of the recess 1′a.

Figure 20:
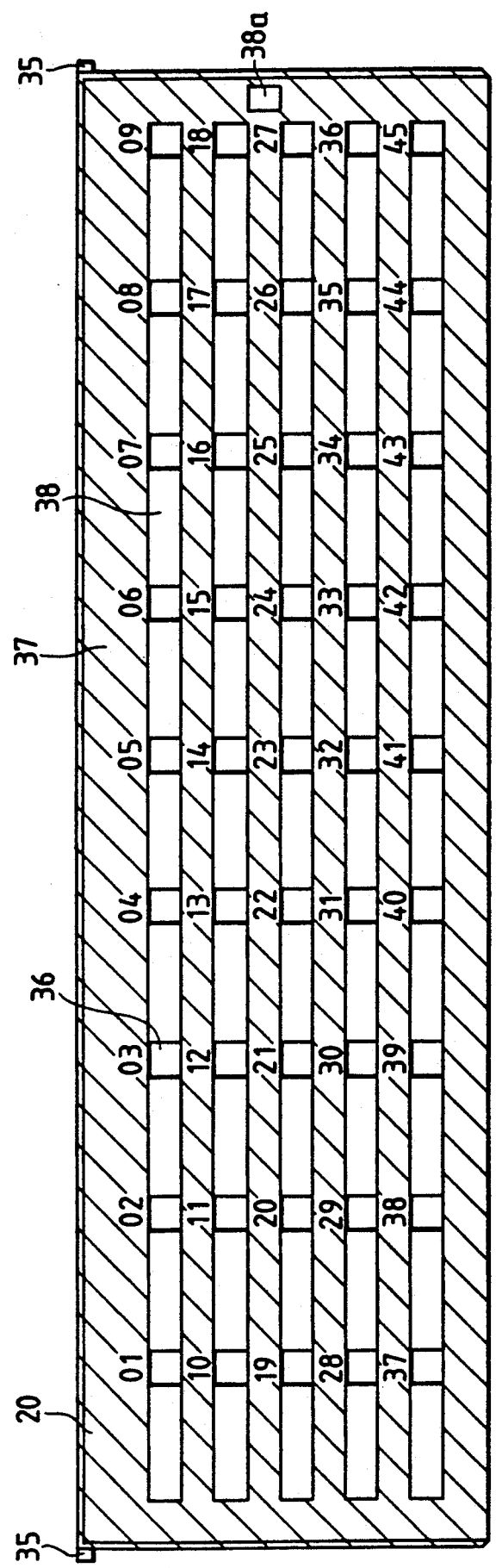
FIG. 20 is a detailed view of a switch cover shown in FIG. 13.

The switch cover 20, as shown in FIG. 20, is formed into a rectangular plate-like shape of a size corresponding to the recess 1′a. Also, shafts 35 are formed on the underside of the switch cover 20 at the inner ends of the opposite side edges thereof. The bearings 33 of the recess 1′a are fitted to the respective shafts 35 and the switch cover 30 is provided on the recess 1′a, i.e., on the slide sheet 21, so as to be openable and closable with the shafts 35 as the fulcrum. Thus, the whole of the slide sheet 21 is covered with the switch cover 20.

Apertures 36 of a size large enough to permit the key tops of the switches 18′ to fit therein are formed at regions of the switch cover 20 which correspond to respective ones of the switches 18′.

Even when the switch cover 20 is closed on the recess 1′a, the key tops of the switches 18′ protrude through the respective apertures 36 so that respective ones of the switches 18′ can be operated. Further, the switch cover 20 has opaque portions 37 formed at vertically every other stage by the printing on the back thereof, as indicated by hatching in FIG. 20, and each area therebetween is a transparent portion 38 as indicated by a white ground. The reference character 38a designates a transparent portion for the marks 24.

Under such structure, the slide sheet 21 is set in the recess 1′a, and with the switch cover 20 closed thereon, the slide member 19 is operated, whereby the indications of the functions of the respective switches 18′ are changed over as will be described hereinafter.

The operation of the above-described construction will now be described with reference to the flow chart of FIG. 7.

When the knob 19c of the slide member 19 is first operated in the direction a, the slide sheet 21 is also slidden in the direction a. At this time, slide member 19 is rectilinearly smoothly moved relative to the frame 25 without back-lash with the aid of the guide groove 19d and the side edge surface 19e. In response to this, the slide sheet 21 is also slidden, but in the coupling construction of the slide sheet 21 and the slide member 19, apertures 21a and 21b for coupling are formed in one end portion of the slide sheet 21 and these apertures 21a and 21b are spaced apart from each other as much as possible and therefore, the sliding operation of the slide sheet 21 can be accomplished stably.

The position to which the slide sheet 21 has been moved in the direction a is a position in which in FIG. 14, the address label sticking position 23 of one touch dial numbers is just opposed to each transparent portion 38 of the switch cover 20. Also, those of the indication are as of the slide sheet 20 which are provided with the indications of the various functions of the facsimile apparatus are just opposed to the opaque portions 37 of the switch cover 20. Accordingly, only the address label sticking position 23 is visually perceived as the indications of the functions of the switches 18′.

Also, at this time, one of the triangular marks 24 provided on the central portion of the right end of the slide sheet 21 which faces the inner side is just opposed to the rectangular transparent portion 38a in the right end portion of the switch cover 20, and indicates the direction in which the slide member 19 and the slide sheet 21 are to be moved next time.

The protrusion 19f of the slide member is not pushing the change-over switch 29 and at this time, the change-over switch 29 is ON.

When from this state, the slide member 19 is then operated in the direction b indicated by the mark 24, the slide sheet 21 is moved in the direction b and the indication areas of the slide sheet 21 indicating the various functions of the facsimile apparatus become just opposed to the transparent portions 38 and the indication areas of the addressed of one touch dial numbers become just opposed to the opaque portions 37. That is, the indications of the various functions of the facsimile apparatus are visually perceived as the indications of the input functions of respective ones of the switches 18′.

Also, at this time, one of the triangular marks 24 on the slide sheet 21 which faces this side is just opposed to the transparent portion 38a at the right end of the switch cover 20, and indicates that the direction in which the slide member 19 and the slide sheet 21 are to be moved next time is toward this side.

The convex portion 19f of the slide member 19 is pushing the change-over switch 29 and at this time, the change-over switch 29 is OFF.

From this state, the knob 19c of the slide member 19 is further operated in the direction a, whereby the state shown in FIG. 12 is restored and only the address label sticking position 23 of one touch dial numbers is visually perceived.

Also, in response to such operation of the slide member 19, i.e., in response to the change-over of the indications of the functions, the input functions of the respective switches 18′ are changed over to the above-described two kinds by the control of the controller 4 of FIGS. 1 and 2. The change-over switch 29 is connected to the controller 4, which effects the change-over of the input functions of the switches 18′ by the procedure shown in FIG. 7 in conformity with the input of ON or OFF from the change-over switch 29. This process is carried out as follows in accordance with the control program stored in the memory of the microcomputer constituting the controller 4.

First, if at the step S1 of FIG. 7, there is a switch input by the operation of a switch 18′, the CPU of the controller 4 proceeds to step S2, where whether the change-over switch 29 is ON or OFF is examined. That is, whether the slide sheet 21 is in a position wherein the indication areas of the addresses of one touch dial numbers are just opposed to the transparent portions 38 of the switch cover 20, or whether the slide sheet 21 is in a position wherein the indication areas of the various functions of the facsimile apparatus are just opposed to the transparent portions 38 is examined.

If the change-over switch 29 is ON and the indications of the addresses of one touch dial numbers are just opposed to the transparent portions 38, advance is made to step S3, where the input mode of the switch 18′ is rendered into the one touch dial number input mode, and a code signal input by the switch 18' is processsed as the input signal of on touch dial numbers.

On the other hand, if the change-over switch 29 is OFF and the indication of the various functions of the facsimile apparatus are just opposed to the transparent portions 38, advance is made to step S4, where the input mode is rendered into the input mode for the various functions of the facsimile apparatus, and the input signal from the switch 18' is processed.

After the step S3 or S4, at step S5, processing conforming to the switch input is effected under the input mode determined in the manner described above. When the processing is terminated, at step S6, the switch input is waited for.

In the manner described above, in the present embodiment, by the operation of the slide member 19, the slide sheet 21 is slid, whereby the indications of the functions of the switches 18' are changed over to two kinds and the input functions of the switches 18' are changed over to two kinds corresponding to the indications. Here, the slide member 19 is a member for holding the slide sheet 21 against movement relative to the slide member 19 and rectilinearly sliding the slide sheet 21, and also functions as detecting means for detecting the position of the slide sheet 21 in which the indications of the functions are changed over as described above, and the slide member 19 singly can perform two functions.

Thus, according to the present embodiment, by the operation of the slide member 19, the change-over of the input functions of the switches 18' of the keyboard portion 11 and the change-over of the indications of the functions can be simply accomplished. Moreover, such change-over is accomplished with the switch cover 20 remaining closed, and there is not a problem that as in the aforedescribed example of the prior art, the cover is opened for the change-over and the interferes with the operation of the apparatus or makes the external appearance of the apparatus ugly.

In the above-described structure, the switch cover 20 can be opened to enable the slide sheet 21 to be removed from the recess 1'a and enable an address label 23 in which one touch dial numbers are entered to be sticked to the slide sheet 21.

Of course, the kinds of the input functions with which the switches 18' are endowed are not limited to those described above. Also, the construction as described above can of course be applied not only to an operation panel device incorporated in a facsimile apparatus, but also to other switch input devices. Further, in the above-described second embodiment, description has been made of two kinds of indication change-over, but three kinds of indication change-over are also possible. In such case, the marks at the intermediate location are designed to indicate the movability in both directions.

As is apparent from the foregoing description, the switch input device of the present invention adopts a construction which has an operation input switch endowed with a plurality of kinds of input functions, an indication member movably provided near said switch and having the indications of said plurality of kinds of input functions discretely provided at different regions on the surface thereof, and a cover member having transparent portions and opaque portions and covering said indication member and in which by said indication member being moved, one different kind of indications among the indications of said plurality of kinds of input functions are just opposed to the transparent portions of said cover member in conformity with the position of said indication member and the other kinds of indications are just opposed to the opaque portions, whereby the indications of the input functions of said switch are changed over, and therefore, by the indication member being moved, the change-over of the indications of the input functions of the operation input switch can be accomplished simply and thus, not only the device itself is good in operability, but also the operability of an electronic instrument into which the device is incorporated can be improved and the external appearance of the instrument can be made good.

Also, the coupling portions to the operating member are provided at two locations on the end portion of said indication member and the two coupling portions are provided in spaced apart relationship with each other o the opposite side edge portions of the end portion of said indication member and therefore, no useless space is required and stable movement of the indication member is ensured, and an optimum construction of the coupling portions between the indication member and the operating member can be realized.

Further, the indication member is provided with marks for indicating the directions of movement of said indication member and is also provided with a second transparent portion for indicating said marks, and design is made such that when said one kind of indications ar being effected, the mark for indicating the direction in which the other kinds of indications are effected is just opposed to said second transparent portion and that when said other kinds of indications are being effected, the mark for indicating the direction in which said one kind of indications are effected is just opposed to said second transparent portion and therefore, in which direction the indication member should be moved by the operating member when the indication member is to be changed over by the operating member can be judged in a moment and moreover, a sense of click is obtained by a click member between the operating member and the keep member holding the operating member and also the stationary position in the direction of operation is determined to thereby enable the switch operation to be performed reliably. Furthermore, a recess for containing the indication member therein is provided in the body of the switch input device and the opposite side edges of the recess are formed into guide portions and also, a guide is provided in the direction of sliding of the operating member, and the operating member is rectilinearly slidden by these to move the indication member and therefore, rectilinear movement of the operating member can be realized to thereby accomplish stable movement of the indication member.

What is claimed is:

1. A switch input device comprising:
   an apparatus body;
   a controller provided in the apparatus body, the controller effecting control of the apparatus in its entirety;
   an operation panel disposed in the apparatus body; and
   a keyboard section disposed in said operation panel, the keyboard section having
   (a) a plurality of key top type input switches having various input functions of the apparatus, said key top type input switches having key tops and being connected to said controller;
   (b) an indication member having a plurality of indication sections which are capable of indicating respectively said various input functions with respect to said plurality of input switches, said indication member being slidable and having apertures corresponding to the key tops of said plurality of input switches, said apertures each being of a such shape that the respective key tops do not interfere with the sliding of said indication member;

(c) an openable/closable cover member for covering said indication member, said cover member having transparent portions and opaque portions, said cover member, when closed, being so disposed that said transparent portions may oppose one of said plurality of the indication sections, and said opaque portions oppose the remaining indication sections and said cover member, when opened, being able to effect an indication on at least one of the plurality of indication sections of said indication member; and change-over means for effecting the change-over of the input functions of said plurality of input switches, said change-over means being connected to said controller, change-over operation of said change over means effecting a change-over of said plurality of input functions under control of said controller and also a sliding movement of said indication member, thereby effecting change-over of the indication section opposed to said transparent portions.

2. A switch input device according to claim 1, wherein said change-over means has a change-over switch, an operating portion for effecting the change-over operation of said change-over switch and the sliding operation of said indication member,
change-over of the input functions of said plurality of input switches being effected under control of said controller in accordance with a change-over signal of said change-over switch.

3. A switch input device according to claim 2, wherein said key board section further includes a frame, said frame having a recess in which said plurality of input switches are disposed, said indication member and said cover member for covering said indication member being contained in said recess of said frame.

4. A switch input device according to claim 3, wherein said cover member contained in said recess is pivotable with one end thereof as a fulcrum.

5. A switch input device according to claim 4, further including detecting means for detecting the pivotal movement of said cover member, said controller changing over the input functions of said plurality of input switches in conformity with the detection signal of said detecting means.

6. A switch input device, comprising:
an apparatus body;
a controller provided in the apparatus body, the controller effecting control of the apparatus in its entirety;
an operation panel disposed in the apparatus body including
(a) a plurality of input switches, having various input functions of the apparatus, said input switches being connected to said controller;
(b) an indication member having a plurality of indicting sections which are capable of indicating respectively said various input functions with respect to said plurality of input switches, said indication member being slidable;

(c) an openable/closeable cover member for covering said indication member, said cover member having transparent portions and opaque portions, said cover member, when closed, being so disposed that said transparent portions may oppose one of said plurality of indication sections and said opaque portions oppose the remaining indication sections and said cover member, when opened, being able to effect an indication on at least one of the plurality of indication sections of said indication member; and (d) change-over means for effecting the change-over of the input functions of said plurality of input switches, said change-over means having an operating section and being connected to said controller, the change-over operation of said operating section of the change-over means effecting a change-over of said plurality of the input functions under control of said controller and also a sliding movement of said indication member, thereby effecting change-over of the indication section opposed to said transparent portions; and (e) indicating means for indicating the direction of operation of said operating section.

7. A switch input device according to claim 6, wherein said indicating means has marks for indicating the direction of sliding of said indication member to said indication member and also has a section transparent portion for effecting the indication of said marks on said cover member, and wherein when one of the indication sections is effecting an indication the mark which indicates the direction where the indication of other indication sections is effected, opposes said second transparent portion.

8. A switch input device comprising:
an apparatus body;
a controller provided in the apparatus body, the controller effecting control of the apparatus in its entirety;
an operation panel disposed in the apparatus body including:
(a) a plurality of input switches having various input functions of the apparatus, said input switches being connected to said controller;
(b) an indication member having a plurality of indication sections which are capable of indicating respectively the various input functions with respect to said plurality of said plurality of input switches, said indication member being slidable;
(c) an openable/closeable cover member for covering said indication member, said cover member having transparent portions and opaque portions, said cover member, when closed, being so disposed that said transparent portions may be opposed to one of said plurality of the indicating sections, and said opaque portions to the remaining indication sections, and said cover member, when opened, being able to effect an indication on at least one of the plurality of indication sections of said indication member;
(d) change-over means for effecting change-over of the input functions of said plurality of input switches, said change-over means having an operation member and being connected to said controller, change-over operation of the operation member of said change-over means effecting change-over of said plurality of the input functions under control of said controller and also a sliding movement of said indication member thereby effecting change-over of the indication section opposed to said transparent portions; and (e) coupling means for coupling said operating member to said indication member, said coupling means having the coupling portions thereof coupled to said operating member provided in spaced apart relationship with each other on the opposite side edge portions of the end portion of said indication member.

9. A switch input device according to claim 8, wherein said operation panel further includes a frame, said frame having a guide portion for guiding movement of said operating member, said operating member being rectilinearly moved along said frame by said guide portion of said frame.

10. A switch input device according to claim 8, wherein said operation panel further includes a frame, said frame having a guide portion for guiding the sliding movement of said indication member provided in a recess, said indication member being rectilinearly slid by said guide portion in said recess of said frame.

11. A switch input device comprising;

an apparatus body;

a controller provided in the apparatus body, the controller effecting control of the apparatus in its entirety;

an operation panel disposed in the apparatus body, said operation panel including:

(a) a plurality of input switches having various input functions of the apparatus, said input switches being connected to said controller;

(b) an indication member having a plurality of indication sections which are capable of indicating respectively said various input functions with respect to said plurality of input switches, said indication member being slidable;

(c) an openable/closeable cover member for covering said indication member, said cover member having transparent portions and opaque portions, said cover member when closed being so disposed that said transparent portions may oppose one of said plurality of the indicating sections and said opaque portions oppose the remaining indication sections, and said cover member when opened being able to effect an indication on at least one of the plurality of the indication sections of said indication member;

(d) change-over means for effecting change-over of the input functions of said plurality of input switches, said change-over means having an operation member and being connected to said controller, change-over operatin of the operation member effecting a change-over of of said plurality of the input functions under control of said controller and also a sliding movement of said indication member thereby effecting change-over of the indication section opposed to said transparent portions;

coupling means for coupling said operation member to said indication member;

a keep member for movably holding said operating member; and a click member provided between said keep member and said operating member, a sense of click being obtained in the operation of said operation member by said click member.

* * * * *

UNITED STATES PATENT AND TRADEMARK OFFICE
CERTIFICATE OF CORRECTION

PATENT NO. : 5,075,686
DATED : December 24, 1991
INVENTOR(S) : YOSHIHIRO SHIGEMURA Page 1 of 4

It is certified that error appears in the above-identified patent and that said Letters Patent is hereby corrected as shown below:

Title page:

BETWEEN [22] AND [51]

Insert:    -- FOREIGN APPLICATION PRIORITY DATA

Jan. 23, 1989  [JP]  Japan ............... 1-12018
        Aug. 31, 1989  [JP]  Japan ............... 1-225566
        Aug. 31, 1989  [JP]  Japan ............... 1-225567
        Aug. 31, 1989  [JP]  Japan ............... 1-225568
        Aug. 31, 1989  [JP]  Japan ............... 1-225569
        Aug. 31, 1989  [JP]  Japan ............... 1-225570 --.

IN [57] ABSTRACT

Line 9, "indications" should read --indication--.

SHEET 4 OF 14

FIG. 5A, "OHSAKA" should read --OSAKA-- and
        "KOHBE" should read --KOBE--.

SHEET 6 OF 14

FIG. 7, "OHSAKA" should read --OSAKA--.

COLUMN 1

Line 19, "is in" should read --has--.

COLUMN 4

Line 17, "length-wisely" should read --lengthwise--.

UNITED STATES PATENT AND TRADEMARK OFFICE
CERTIFICATE OF CORRECTION

PATENT NO.  : 5,075,686
DATED       : December 24, 1991
INVENTOR(S) : YOSHIHIRO SHIGEMURA It is certified that error appears in the above-identified patent and that said Letters Patent is hereby corrected as shown below:

COLUMN 5

Line 10, "other wise" should read --otherwise--.

COLUMN 6

Line 18, "a" should read --as--.
Line 21, "indicatins" should read --indications--.
Line 29, "above," should read --above.--.
Line 33, "slidden" should read --slid--.

COLUMN 7

Line 22, "slidden" should read --slid--.
Line 29, "have" should read --has--.

COLUMN 8

Line 14, "firs&" should read --first--.
Line 57, "been" should read --has been--.

COLUMN 9

Line 9, "are" should read --area--.
Line 22, "lengthwisely" should read --lengthwise--.

COLUMN 10

Line 11, "widthwisely" should read --widthwise--.

UNITED STATES PATENT AND TRADEMARK OFFICE
CERTIFICATE OF CORRECTION

PATENT NO. : 5,075,686
DATED : December 24, 1991
INVENTOR(S) : YOSHIHIRO SHIGEMURA It is certified that error appears in the above-identified patent and that said Letters Patent is hereby corrected as shown below:

COLUMN 11

Line 49, "slidden" should read --slid--.
Line 51, "back-lash" should read --backlash--.
Line 65, "are as" should read --areas-- and "sheet 20" should read --sheet 21--.

COLUMN 12

Line 19, "addressed" should read --addresses--.

COLUMN 13

Line 1, "processsed" should read --processed--.
Line 2, "on" should read --one--.
Line 43, "sticked" should read --stuck--.

COLUMN 14

Line 16, "o" should read --on--.
Line 28, "ar" should read --is--.
Line 33, "are" should read --is--.
Line 49, "slidden" should read --slid--.

COLUMN 15

Line 19, "change-over" (first occurrence) should read --(d) change-over--.
Line 23, "change over" should read --change-over--.
Line 39, "key board" should read --keyboard--.
Line 64, "indict-" should read --indicat- --.

UNITED STATES PATENT AND TRADEMARK OFFICE
CERTIFICATE OF CORRECTION

PATENT NO. : 5,075,686
DATED : December 24, 1991
INVENTOR(S) : YOSHIHIRO SHIGEMURA It is certified that error appears in the above-identified patent and that said Letters Patent is hereby corrected as shown below:

COLUMN 16

Line 11, "and" should be deleted.
    Line 28, "section" should read --second--.
    Line 48, "said plurality of" (second occurrence) should be deleted.

COLUMN 17

Line 23, "comprising;" should read --comprising:--.

COLUMN 18

Line 14, "ber;" should read --ber; and--.
    Line 19, "operatin" should read --operation--.
    Line 20, "of" (second occurrence) should be deleted.

Signed and Sealed this

Sixth Day of July, 1993

Attest:

MICHAEL K. KIRK

Attesting Officer     Acting Commissioner of Patents and Trademarks